(12) United States Patent
Sun

(10) Patent No.: US 8,450,450 B2
(45) Date of Patent: May 28, 2013

(54) POLYETHER GLYCOL MANUFACTURING PROCESS

(75) Inventor: Qun Sun, Wilmington, DE (US)

(73) Assignee: Invista North America S.A R.L., Wilmington, DE (US)

( * ) Notice: Subject to any disclaimer, the term of this patent is extended or adjusted under 35 U.S.C. 154(b) by 252 days.

(21) Appl. No.: 12/859,321

(22) Filed: Aug. 19, 2010

(65) Prior Publication Data

US 2011/0207910 A1    Aug. 25, 2011

Related U.S. Application Data

(60) Provisional application No. 61/236,332, filed on Aug. 24, 2009.

(51) Int. Cl.
*C08G 65/10* (2006.01)

(52) U.S. Cl.
USPC ........... 528/405; 528/416; 528/613; 528/617; 528/418; 528/427; 528/408

(58) Field of Classification Search
USPC ................ 528/418, 416, 613, 617, 405, 427, 528/408
See application file for complete search history.

(56) References Cited

U.S. PATENT DOCUMENTS

| | | | |
|---|---|---|---|
| 3,282,875 A | 11/1966 | Connolly et al. | |
| 4,120,903 A | 10/1978 | Pruckmayr et al. | |
| 4,139,567 A | 2/1979 | Pruckmayr | |
| 4,163,115 A | 7/1979 | Heinsohn et al. | |
| 2003/0016682 A1 | 1/2003 | Cho | |
| 2010/0267905 A1 * | 10/2010 | Sun et al. | 526/67 |
| 2010/0267926 A1 * | 10/2010 | Sun et al. | 528/405 |

FOREIGN PATENT DOCUMENTS

| | | |
|---|---|---|
| CN | 101733106 | 6/2010 |
| EP | 0985448 | 3/2000 |
| GB | 146407 | 11/1921 |
| GB | 255884 | 4/1927 |
| GB | 703826 | 2/1954 |
| JP | 2001-335326 | 12/2001 |

OTHER PUBLICATIONS

"Polytetrahydrofuran" by P. Dreyfuss (Gordon & Breach, N.Y., 1982).
Solvay Solexis—"Aquivion" Low-EW PFSA Dispersions Product Overview.
Solvay Solexis—News Release Dec. 9, 2008—Solvay Solexis Launches "AQUIVION" PFSA.

* cited by examiner

*Primary Examiner* — Robert D. Harlan
(74) *Attorney, Agent, or Firm* — Robert B. Furr, Jr.; Dennis P. Santini

(57) ABSTRACT

The present invention relates to an improved process for manufacturing polyether and copolyether glycols by polymerization of a reaction mixture comprising at least one tetrahydrofuran or at least one tetrahydrofuran and at least one other cyclic ether, for example, an alkylene oxide, in the presence of a particular perfluorosulfonic acid resin catalyst comprising a copolymer of tetrafluoroethylene (TFE) or chlorotrifluoroethylene (CTFE) and a monomer of the formula $CF_2=CF-O-CF_2-CF_2-SO_2F$.

10 Claims, No Drawings

POLYETHER GLYCOL MANUFACTURING PROCESS

CROSS-REFERENCE TO RELATED APPLICATION

This application claims benefit of priority from U.S. Provisional Application No. 61/236,332, filed Aug. 24, 2009. This application hereby incorporates by reference U.S. Provisional Application No. 61/236,332 in its entirety.

FIELD OF THE INVENTION

The present invention relates to an improved process for manufacturing polyether and copolyether glycols by polymerization of a reaction mixture comprising at least one tetrahydrofuran or at least one tetrahydrofuran and at least one other cyclic ether, for example, an alkylene oxide, in the presence of a particular perfluorosulfonic acid resin as catalyst. More particularly, the invention relates to a polymerization process for manufacturing polyether and copolyether glycols by polymerization of a reaction mixture comprising at least one tetrahydrofuran or at least one tetrahydrofuran and at least one other cyclic ether, for example, an alkylene oxide, in the presence of catalyst comprising a copolymer of tetrafluoroethylene (TFE) or chlorotrifluoroethylene (CTFE) and a monomer of the formula $CF_2\!=\!CF\!-\!O\!-\!CF_2\!-\!CF_2\!-\!SO_2F$.

BACKGROUND OF THE INVENTION

Homopolymers of tetrahydrofuran (THF), also known as polytetramethylene ether glycols (PTMEG), are well known for use as soft segments in polyurethanes and other elastomers. These homopolymers impart superior dynamic properties to polyurethane elastomers and fibers. Copolymers of THF and at least one other cyclic ether, also known as copolyether glycols, are known for use in similar applications, particularly where the reduced crystallinity imparted by the other cyclic ether may improve certain dynamic properties of a polyurethane which contains such a copolymer as a soft segment. Among the other cyclic ethers used for this purpose are ethylene oxide and propylene oxide.

Copolymers of THF and cyclic ether are well known in the art. Their preparation is disclosed, for example, by Pruckmayr in U.S. Pat. No. 4,139,567 and U.S. Pat. No. 4,153,786. Such copolymers can be prepared by any of the known methods of cyclic ether polymerization, described for instance in "Polytetrahydrofuran" by P. Dreyfuss (Gordon & Breach, N.Y. 1982). Such polymerization methods include catalysis by strong proton or Lewis acids, by heteropoly acids, as well as by perfluorosulfonic acids or acid resins. In some instances it may be advantageous to use a polymerization promoter, such as a carboxylic acid anhydride, as disclosed in U.S. Pat. No. 4,163,115. In these cases the primary polymer products are diesters, which need to be hydrolyzed in a subsequent step to obtain the desired polyether glycols.

Other methods for manufacturing copolyether glycols are known in the art, such as for example as shown in U.S. Pat. Nos. 4,192,943; 4,228,272; 4,564,671; and 4,585,592; and in published patent applications WO 03/076453 and WO 03/076494. For example, U.S. Pat. No. 4,564,671 discloses a process for polymerization of THF with a 1,2-alkylene oxide in the presence of a compound containing reactive hydrogen and a fixed-bed clay catalyst in which less than 30% by weight of a mixture of THF, 1,2-alkylene oxide, and a compound containing reactive hydrogen is added to the reaction mixture, which is then recycled to the reactor. U.S. Pat. No. 4,728,722 discloses such polymerization batchwise with a 1,2-alkylene oxide in the presence of compounds containing reactive hydrogen over a bleaching earth or zeolite catalyst, the 1,2-alkylene oxide being fed to the reaction mixture in such a manner that the concentration of the 1,2-alkylene oxide in the reaction mixture is kept below 2% by weight during the polymerization. U.S. Pat. No. 5,268,345 discloses polymerization of THF with ethylene oxide when montmorillonite catalyst which has been regenerated by the process disclosed therein is used. U.S. Pat. No. 4,192,943 discloses that copolyether glycol based on THF and alkylene oxides varies with the method of production. U.S. Pat. No. 4,677,231 discloses use of diluent or solvent for purification of copolyether glycol having a normal molar incorporation of alkylene oxide manufactured in a polymerization process utilizing a normal concentration of alkylene oxide as a feedstock component.

U.S. Pat. Nos. 4,120,903 and 4,139,567 disclose preparation of copolyether glycols by copolymerizing THF and an alkylene oxide or cyclic acetal over catalyst comprising a polymer containing fluorosulfonic acid groups and with water or an alkanediol as a chain terminator.

A number of publication families describe fluorosulfonic acid resins and their use as catalyst material for polymerization reactions. Among these are U.S. Pat. Pub. 2009/0118456, disclosing use of perfluorinated ion-exchange polymer containing pendant sulfonic acid and carboxylic acid groups; U.S. Pat. No. 6,040,419, disclosing use of fluorinated sulfonic acid-containing polymer containing at least 0.05 equivalents of fluorinated sulfonic acid group per kg of polymer; WO 95/19222, disclosing use of perfluorinated ion-exchange polymer containing pendant sulfonic acid and carboxylic acid groups; and U.S. Pat. No. 5,118,869, disclosing use of a blend of a fluorinated resin containing sulfonic acid groups and a fluorinated resin containing carboxylic acid groups. Likewise, U.S. Pat. No. 5,403,912 discloses use of a perfluorinated resin sulfonic acid consisting of a backbone of fluoropolymer. U.S. Pat. Pub. 2008/0071118 discloses use of a resin having a perfluoroalkylsulfonic acid group as a side chain in a list of possible catalysts. U.S. Pat Pub. 2003/176630 discloses use of polymers comprising alpha-fluorosulfonic acids.

None of the above publications teach the production of polyether or copolyether glycols by polymerization of a reaction mixture comprising at least one tetrahydrofuran or at least one tetrahydrofuran and at least one other cyclic ether, for example, an alkylene oxide, in the presence of a particular perfluorosulfonic acid resin as catalyst, the perfluorosulfonic acid resin being a copolymer of tetrafluoroethylene (TFE) or chlorotrifluoroethylene (CTFE) and a monomer of the formula $CF_2\!=\!CF\!-\!O\!-\!CF_2\!-\!CF_2\!-\!SO_2F$. A simple, economical, improved process for manufacturing polyether and copolyether glycols by polymerization of a reaction mixture comprising tetrahydrofuran or tetrahydrofuran and at least one other cyclic ether is provided by the present invention.

SUMMARY OF THE INVENTION

The present invention provides an improved process for manufacturing polyether and copolyether glycols by polymerization of a reaction mixture comprising at least one tetrahydrofuran or at least one tetrahydrofuran and at least one other cyclic ether, for example, an alkylene oxide, in the presence of a particular perfluorosulfonic acid resin as catalyst. The present improved process for manufacturing polyether glycol or copolyether glycol having a number average molecular weight of from about 200 dalton to about 30,000 dalton comprises the step of polymerizing at least one tetrahydrofuran or at least one tetrahydrofuran and at least one other cyclic ether, for example alkylene oxide, at polymerization effective conditions including, for example a temperature of from about 0° C. to about 80° C., in the presence of catalyst comprising perfluorosulfonic acid resin being a copolymer of tetrafluoroethylene (TFE) or chlorotrifluoroethylene (CTFE) and a monomer of the formula $CF_2=CF-O-CF_2-CF_2-SO_2F$, optionally in the presence of an acylium ion precursor, carboxylic acid, and/or a chain terminator.

An embodiment of the present invention, therefore, provides an improved process for manufacturing poly(tetramethylene ether) glycol (PTMEG), its copolymers and their esters by polymerization of a reaction mixture comprising tetrahydrofuran (THF) and optional comonomers which comprises the step of polymerizing at least one tetrahydrofuran at polymerization effective conditions including, for example a temperature of from about 0° C. to about 80° C., in the presence of catalyst comprising perfluorosulfonic acid resin being a copolymer of tetrafluoroethylene (TFE) or chlorotrifluoroethylene (CTFE) and a monomer of the formula $CF_2=CF-O-CF_2-CF_2-SO_2F$, optionally in the presence of an acylium ion precursor, carboxylic acid, and/or a chain terminator.

Another embodiment of the present invention, therefore, provides an improved process for manufacturing poly(tetramethylene-co-alkyleneether) glycol having a number average molecular weight of from about 650 dalton to about 4000 dalton, and a viscosity of from about 80 cP to about 4000 cP, which comprises the step of polymerizing at least one tetrahydrofuran and at least one alkylene oxide at polymerization effective conditions including, for example a temperature of from about 0° C. to about 80° C., in the presence of catalyst comprising perfluorosulfonic acid resin being a copolymer of tetrafluoroethylene (TFE) or chlorotrifluoroethylene (CTFE) and a monomer of the formula $CF_2=CF-O-CF_2-CF_2-SO_2F$, optionally in the presence of an acylium ion precursor, carboxylic acid, and/or a chain terminator.

Another embodiment of the present invention, therefore, provides an improved process for manufacturing poly(tetramethylene-co-ethyleneether) glycol a number average molecular weight of from about 650 dalton to about 4000 dalton, and a viscosity of from about 80 cP to about 4000 cP, which comprises the step of polymerizing at least one tetrahydrofuran and ethylene oxide at polymerization effective conditions including, for example a temperature of from about 0° C. to about 80° C., in the presence of catalyst comprising perfluorosulfonic acid resin being a copolymer of tetrafluoroethylene (TFE) or chlorotrifluoroethylene (CTFE) and a monomer of the formula $CF_2=CF-O-CF_2-CF_2-SO_2F$, optionally in the presence of an acylium ion precursor, carboxylic acid, and/or a chain terminator.

DETAILED DESCRIPTION OF THE INVENTION

As a result of intense research in view of the above, we have discovered an improved process whereby we can manufacture polyether and copolyether glycols having a number average molecular weight of from about 200 dalton to about 30,000 dalton, for example from about 650 dalton to about 4,000 dalton, and a viscosity of from about 80 cP to about 4000 cP. The improved process of the invention comprises the step of polymerization of a reaction mixture comprising at least one tetrahydrofuran or at least one tetrahydrofuran and at least one other cyclic ether, for example, an alkylene oxide, at polymerization effective conditions, hereinafter more fully described, in the presence of a particular perfluorosulfonic acid resin as catalyst, and optionally in the presence of an acylium ion precursor, carboxylic acid, and/or a chain terminator. The perfluorosulfonic acid resin catalyst for use herein comprises a copolymer of tetrafluoroethylene (TFE) or chlorotrifluoroethylene (CTFE) and a monomer of the formula $CF_2=CF-O-CF_2-CF_2-SO_2F$. Following the polymerization step, polyether and copolyether glycols having a number average molecular weight of from about 200 dalton to about 30,000 dalton, for example from about 650 dalton to about 4,000 dalton, and a viscosity of from about 80 cP to about 4000 cP are recovered. In this process, a very high percentage, such as for example, from about 95 to about 100 wt %, of the tetrahydrofuran or other cyclic ether, for example alkylene oxide, in the feedstock to the polymerization step is consumed in the reaction. In an embodiment of the present invention, unreacted feedstock tetrahydrofuran, other cyclic ether, e.g. alkylene oxide, dimer of the alkylene oxide if present, and any lower boiling components present are removed.

The term "polymerization", as used herein, unless otherwise indicated, includes the term "copolymerization" within its meaning.

The term "PTMEG", as used herein, unless otherwise indicated, means polytetramethylene ether glycol. PTMEG is also known as polyoxybutylene glycol.

The term "copolyether glycol", as used herein in the singular, unless otherwise indicated, means copolymers of tetrahydrofuran and at least one other cyclic ether, e.g. alkylene oxide, which are also known as polyoxybutylene polyoxyalkylene glycols. An example of a copolyether glycol is a copolymer of tetrahydrofuran and ethylene oxide. This copolyether glycol is also known as poly(tetramethylene-co-ethyleneether) glycol.

The term "THF", as used herein, unless otherwise indicated, means tetrahydrofuran and includes within its meaning alkyl substituted tetrahydrofuran capable of copolymerizing with THF, for example 2-methyltetrahydrofuran, 3-methyltetrahydrofuran, and 3-ethyltetrahydrofuran.

The term "alkylene oxide", as used herein, unless otherwise indicated, means a compound containing two, three or four carbon atoms in its alkylene oxide ring. The alkylene oxide can be unsubstituted or substituted with, for example, linear or branched alkyl of 1 to 6 carbon atoms, or aryl which is unsubstituted or substituted by alkyl and/or alkoxy of 1 or 2 carbon atoms, or halogen atoms such as chlorine or fluorine. Examples of such compounds include ethylene oxide (EO); 1,2-propylene oxide; 1,3-propylene oxide; 1,2-butylene oxide; 1,3-butylene oxide; 2,3-butylene oxide; styrene oxide; 2,2-bis-chloromethyl-1,3-propylene oxide; epichlorohydrin; perfluoroalkyl oxiranes, for example (1H,1H-perfluoropentyl) oxirane; and combinations thereof.

The THF used as a reactant in the process of the invention can be any of those commercially available. Typically, the THF has a water content of less than about 0.03% by weight and a peroxide content of less than about 0.005% by weight. If the THF contains unsaturated compounds, their concentration should be such that they do not have a detrimental effect on the polymerization process of the present invention or the polymerization product thereof. For example, for some applications it is preferred that the copolyether glycol product of the present invention having a high molar concentration of alkylene oxide has low APHA color, such as, for example less than about 100 APHA units. Optionally, the THF can contain an oxidation inhibitor such as butylated hydroxytoluene (BHT) to prevent formation of undesirable byproducts and color. If desired, one or more alkyl substituted THF's capable of copolymerizing with THF can be used as a co-reactant, in an amount from about 0.1 to about 70% by weight of the THF. Examples of such alkyl substituted THF's include 2-methyltetrahydrofuran, 3-methyltetrahydrofuran, and 3-ethyltetrahydrofuran.

The alkylene oxide used as a reactant in the present process, as above indicated, may be a compound containing two, three or four carbon atoms in its alkylene oxide ring. The alkylene oxide can be unsubstituted or substituted with, for example, alkyl groups, aryl groups, or halogen atoms. It may be selected from, for example, the group consisting of ethylene oxide; 1,2-propylene oxide; 1,3-propylene oxide; 1,2-butylene oxide; 2,3-butylene oxide; 1,3-butylene oxide; 2,2-bischloromethyl oxetane; epichlorohydrin and combinations thereof. Preferably, the alkylene oxide has a water content of less than about 0.03% by weight, a total aldehyde content of less than about 0.01% by weight, and an acidity (as acetic acid) of less than about 0.002% by weight. The alkylene oxide should be low in color and non-volatile residue.

If, for example, the alkylene oxide reactant is EO, it can be any of those commercially available. Preferably, the EO has a water content of less than about 0.03% by weight, a total aldehyde content of less than about 0.01% by weight, and an acidity (as acetic acid) of less than about 0.002% by weight. The EO should be low in color and non-volatile residue.

The optional acylium ion precursor for use in the process of the present invention can be any compound capable of generating the acetyl oxonium ion of THF under reaction conditions. "Acylium ion", as used herein, means an ion represented by the structure $R-C^+=O$, wherein R is hydrogen or a hydrocarbon radical of from 1 to 16 carbon atoms, preferably an alkyl radical of from 1 to 16 carbon atoms.

Representative of acylium ion precursors are acetyl halides and carboxylic acid anhydrides. Anhydrides of carboxylic acids whose carboxylic acid moieties contain from 1 to 16 carbon atoms are preferred, especially those of from 1 to 4 carbon atoms. Non-limiting examples of such anhydrides are acetic anhydride, propionic anhydride and formic-acetic anhydride. The anhydride preferred for use herein because of its efficiency is acetic anhydride. The acylium ion precursor is ordinarily present in the reaction mixture, at least initially, at a concentration of from about 0.1 to about 15 wt %, preferably from about 0.7 to about 10 wt %.

The molecular weight of the polymer product can be limited by the optional addition to the reaction mixture of an aliphatic carboxylic acid of form 1 to 16 carbon atoms, preferably from 1 to 5 carbon atoms. Acetic acid is preferred for use herein due to its low cost and effectiveness. The acylium ion precursor/carboxylic acid weight ratio should be within the range of from about 20:1 to about 0.1:1, preferably from about 10:1 to about 0.5 to 1. Generally speaking, the more carboxylic acid used, the lower the molecular weight of the product. The aliphatic carboxylic acid, when it is used, is ordinarily added to the reaction mixture at a concentration of from about 0.1 to about 10%, by weight of the THF, preferably from about 0.5 to about 5 wt %.

It is noted that since the preferred acylium ion precursor, acetic anhydride, reacts with THF and the catalyst to give the corresponding acid, separate addition of an acid in that instance is not necessary, although it is generally desirable for improved molecular weight control. To obtain a product having a commercially desirable number average molecular weight of 650 to 30,000 dalton, it is preferred that the acylium ion precursor and carboxylic acid be present in the reaction mixture at a combined concentration of from about 0.5 to about 20%, by weight of the reaction mass, preferably from about 1 to about 10 wt %.

The optional chain terminator for use in the process of the present invention is selected from the group consisting of water, alkanediol containing from 2 to about 10 carbon atoms and combinations thereof. Water and 1,4-butanediol are preferred for their low cost and availability. These compounds can be used in combination to regulate the molecular weight of the final product.

The catalyst for use in the present invention is a copolymer of an ethylenically unsaturated monomer selected from the group consisting of TFE and CTFE and a monomer of the formula $CF_2=CF-O-CF_2-CF_2-SO_2F$. This catalyst can be prepared according to U.S. Pat. No. 3,282,875, incorporated herein by reference, and is available commercially from Solvay Company as a perfluorosulfonic acid resin for other uses. The catalyst has an equivalent weight of from 700 to 1100 grams/gram-mol of sulfonic acid, preferably from 850 to 1000 grams/gram-mol of sulfonic acid. "Equivalent weight" of the catalyst is that weight in grams which contains one gram equivalent weight of sulfonic acid ($-SO_3H$) groups which can be determined by titration.

The catalyst is present in the polymerization step of the present invention in a catalytically effective amount, which in the usual case means a concentration of from about 0.01% to about 30% by weight of the reaction mixture, preferably from about 0.05% to about 15%, even more preferably from about 0.1% to about 10%.

The catalyst for use according to the present invention can be in the form of powders or as shaped bodies, for example in the form of beads, cylindrical extrudates, spheres, rings, spirals, chopped film or granules.

The polymerization step of the present invention is generally carried out at from about 0° C. to about 80° C., such as from about 20° C. to about 70° C., for example from about 30° C. to about 70° C. In either the batch or continuous mode, the process is ordinarily run at atmospheric pressure, but reduced or elevated pressure may be used to aid in controlling the temperature of the reaction mixture during the reaction. For example, the pressure employed may be from about 200 to about 800 mmHg, for example from about 300 to about 500 mmHg.

To avoid the formation of peroxides, the polymerization step of the present process may be conducted under an inert gas atmosphere. Non-limiting examples of suitable inert gases for use herein include nitrogen, carbon dioxide, or the noble gases.

The polymerization step of the present invention can also be carried out in the presence of hydrogen at hydrogen pressure of from about 0.1 to about 10 bars.

The process of the invention can be carried out in a batch mode or continuously. When run continuously, the process is preferably conducted in a back-mixed slurry reactor, with continuous stirring and with continuous addition of reactants, including optional acylium ion precursor and/or chain terminator, and continuous removal of product. Alternatively, the process can be run in a pipeline reactor.

In either a slurry reactor or a pipeline reactor, it is preferable to adjust the temperature in the reaction zone, the concentration of reactants in the reaction zone, and the flow rate of the reactants into and out of the reaction zone so that from about 5 to about 85% by weight, preferably from about 15 to about 60%, even more preferably from about 15 to about 40% by weight of the THF is converted on each pass through the reactor. With proper adjustment of concentrations of reactants in the feed stream, of flow rates and of temperature, the residence time of the reactants in a continuous reactor can be from about 10 minutes to about 10 hours, such as from about 20 minutes to about 5 hours, for example from about 30 to about 3 hours.

When using an acylium ion precursor, THF is converted to ester end-capped PTMEG. The effluent of each pass when using an acylium ion precursor, after the desired product has been removed, can be recycled to the reactor. It is also preferable that at least about 40% by weight, even more preferably at least about 80%, such as at least about 90% by weight, of the acylium ion precursor be consumed on each pass of reactants through the reactor.

In a batch reactor embodiment of the present process, THF, acylium ion precursor, catalyst and optionally carboxylic acid, are placed in the reactor. Alternatively, THF and catalyst can be added to a batch reactor. Polymerization can be monitored by, for example, periodic sampling and analysis. Adding a stoichiometric excess amount of chain terminator to the reaction mixture can stop polymerization. When the reaction is finished, catalyst and reaction mixture are separated, and desired product is separated from the remainder of the mixture.

Residence time (in minutes) is determined by measuring the volume (in milliliters) of the reaction zone and then dividing this figure by the flow rate (in milliliters per minute) of the reactants through the reactor. In a slurry reactor, the reaction zone is the entire volume of the reaction mixture; in a pipeline reactor the reaction zone is the zone containing the catalyst. The time required for the present improved process to provide a given conversion of THF to polymer depends upon the conditions under which it is run. Time will therefore vary with temperature, pressure, concentrations of reactants and catalyst; and like factors. Generally, however, in a continuous mode, the process is run to give a residence time from about 10 minutes to about 10 hours, such as from about 20 minutes to about 5 hours, for example from about 30 to about 3 hours. In the batch mode, the residence time is ordinarily from about 1 to about 24 hours.

On completion of the polymerization reaction, the catalyst can be separated from the reaction mixture by filtration, decantation or centrifugation, and reused. If the process is run in a continuous fashion, the catalyst can simply be allowed to remain in the reactor while fresh reactants are fed in and product is removed.

When using an acylium ion precursor, in either the batch or continuous mode, after removal of the catalyst, the product is separated from the reaction mixture by extracting residual unreacted THF, acylium ion precursor and carboxylic acid from the reaction mixture by distillation or by stripping the reaction mixture with steam or an inert gas such as nitrogen.

The ester end-capped product thus produced can range in physical properties from a clear viscous liquid to a waxy solid at room temperature. When the cyclic ether of the reaction mixture is THF, the ester end-capped product can be converted to PTMEG by reacting it with an alkanol using a basic catalyst to give PTMEG and an alkyl acetate byproduct. This is described in greater detail in U.S. Pat. No. 4,230,892, incorporated herein by reference. PTMEG is prepared directly in the absence of an acylium ion precursor, when using a chain terminator. The number average molecular weight of the PTMEG product, determined by end group analysis using spectroscopic methods well known in the art, can be as high as about 30,000 dalton, but will usually range from 650 to about 5000 dalton, and more commonly will range from about 650 to 3000 dalton.

The molecular weight of the product can be kept within any range desired by varying the carboxylic acid/acylium ion precursor ratio in the reactant feed, by varying the concentration of chain terminator, by varying the total amounts of carboxylic acid and precursor in the reactant feed, by varying the temperature of the reaction mass within the above limits, by controlling the residence time of the reactants in the reaction zone and by varying the catalyst concentration. Generally speaking, use of larger amounts of carboxylic acid and/or acylium ion precursor gives polymers with lower molecular weights; use of larger amounts of chain terminator gives polymers with lower molecular weights; lower reaction temperatures favor production of polymers with higher molecular weights and higher temperatures favor production of polymers with lower molecular weights; and higher catalyst concentrations favor lower molecular weights.

The following Examples demonstrate the present invention and its capability for use. The invention is capable of other and different embodiments, and its several details are capable of modifications in various apparent respects, without departing from the spirit and scope of the present invention. Accordingly, the Examples are to be regarded as illustrative in nature and non-limiting.

Materials

The THF is obtained from Chemcentral Corporation. The acetic anhydride and acetic acid is purchased from Aldrich Chemical. The 4 mil thick Solexis Aquivion® membrane E87-105 used as catalyst is purchased from the Solvay Company in Italy. This material has an equivalent weight of 900 g/eq which translates to an acid capacity of 1.11 meq $H^+$/g. The comparative example catalyst used in the prior art is obtained from the DuPont Company, Wilmington, Del., USA, as a 5 mil thick Nafion® perfluorinated sulfonic acid resin membrane 115, which has an equivalent weight of 1060 g/eq and an acid capacity of 0.94 meq $H^+$/g.

Analytical Methods

The conversion to the poly(tetramethylene ether) acetate (PTMEA) is defined by the weight percent of non-volatiles in the crude product mixture collected from the reactor exit, which is measured by a vacuum oven (120° C. and about 200 mmHg) removal of the volatiles in the crude product mixture. The APHA color of the products is determined per ASTM method D 4890 using a Hunter colorimeter. The PTMEA molecular weight and molecular weight distribution are determined by GPC, which is performed by HP 1090 series II liquid chromatography with a Waters Ultrastyragel 500 Å column. THF is used as eluant. Polystyrene and PTMEG standards are used for calibration. The polydispersity is calculated as the ratio between the Mw/Mn.

EXAMPLES

All parts and percentages are by weight unless otherwise indicated.

Catalyst Pretreatment

Before use in the polymerization experiments described below, both membranes for use as catalysts, the Solexis Aquivion® membrane and the Nafion® membrane, are cut into about 2 mm×2 mm squares. Then the cut membranes are subjected to hydrothermal treatment. In particular, 1 part membrane catalyst is mixed with 6 parts distilled water in an autoclave reactor and the mixture is brought to 180° C. under mechanical agitation for 2 hours. After cooling down to room temperature the membrane catalyst is separated from the liquor via filtration and further rinsed and washed with a large amount of distilled water and dried for the polymerization experiments. The solubles from the pretreatment as described here are 17 wt % from the Solexis Aquivion® E87-105 membrane and 11 wt % from the Nafion® 115 membrane, respectively.

Example 1

A three-necked flask equipped with a mechanical agitator and a condenser is used as the polymerization batch reactor for this example. The reactor is charged at atmospheric pressure with 246 grams of THF, 15 grams of acetic anhydride (5.5 wt %), and 9 grams of acetic acid (3.0 wt %), and heated. After the temperature stabilizes at the set point of 45° C., the reaction is initiated by adding 16 grams (5.5 wt % of the reaction mixture) of the pretreated solid resin Solexis Aquivion® E87-105 film (dried at 130° C. in a vacuum oven for over 3 hours) as catalyst. Samples are taken at different time intervals and analyzed for THF conversion by drying the unreacted reagents in a vacuum oven at 120° C. Molecular weight information is obtained by a gel permeability chromatographic (GPC) analysis of the polymer product. The mean molecular weights of the samples taken prove to be about 1000 dalton. The reaction is treated as an equilibrium polymerization. The rate constant for the THF polymerization is determined by plotting the log of (Mo−Me)/(Mt−Me) versus reaction time (t) where Mo, Mt and Me are the THF concentrations before the reaction, at time t, and at equilibrium, respectively. In general, good linear relationships are obtained using data obtained before about 40 wt % conversions. The APHA color of the product is determined to be less than 100 APHA units. Catalyst activities are compared based on the rate constants (in the unit of L/g cat hr) under the same reaction conditions.

Comparative Example 1

The experiment of Example 1 is repeated, except for the catalyst being the pretreated and dried solid resin Nafion® 115 film material. Results for Example 1 and Comparative Example 1 THF batch polymerization experiments are provided in Table 1 in conversions of THF at reaction times listed.

TABLE 1

| Reaction Time (minutes) | Example 1 | Comparative Example 1 |
|---|---|---|
| 0 | 0.0 | 0.0 |
| 5 | 5.7 | 1.7 |
| 15 | 22.7 | 11.0 |
| 30 | 38.6 | 24.2 |
| 60 | 45.9 | 39.7 |
| 120 | 46.4 | 49.2 |

The data in Table 1 indicate that the catalyst of Example 1 is significantly more active than the catalyst of Comparative Example 1, which is reflected by the data in the early stage of the batch THF polymerization, i.e. the kinetic region. Both eventually reach the final conversion that is limited by the available acetic anhydride in the reaction mixture. The rate constant for the catalyst of Example 1, 0.041 L/g cat hr, is calculated to be nearly twice that of the Comparative Example 1 catalyst of 0.021 L/g cat hr. This nearly doubling of activity for the Example 1 catalyst vs. the Comparative Example 1 catalyst, i.e. >95% improvement, is totally unexpected.

Example 2

Continuous THF polymerization is carried out at 45° C. and atmospheric pressure in a 500 ml glass reactor, with an effective working volume of 250 ml, equipped with a side outlet and a mechanical agitator with a speed of approximately 250 rpm. The reaction mixture contains 4.5 wt % acetic acid, 4.5 wt % acetic anhydride, and 91 wt % THF, which is fed by a pump to the top of the reactor. The product mixture flows out of the reactor through the side outlet which is covered by polyethylene cloth to retain the catalyst. The reactor capacity for the reaction mixture is therefore about 250 ml. Then added are 16 grams (6.5 wt % of the reaction mixture) of the pretreated solid resin Solexis Aquivion® E87-105 film as catalyst. The reactor is continuously agitated during the course of the experiment. Various feed rates are used, in the range of 1.7 ml/min to 12.3 ml/min. A small sample (2-3 ml) of the product is taken at intervals and dried in a vacuum oven for 3 hours at 120° C. for conversion measurements. The bulk of the product mixture is collected every few hours and the unreacted feed materials are removed using a rotary evaporator at a temperature of about 99° C. (boiling water bath) to provide the poly(tetramethylene ether) acetate (PTMEA) products for analyses.

The PTMEA samples are measured for THF conversion or PTMEA productivity and the molecular weight of the PTMEA by GPC. The performance of the catalyst at the various feed rates is compared based on the THF conversions or the catalyst's PTMEA productivity, space time yield (STY) in the units of PTMEA g/g cat hr. The APHA color of the product is determined to average about 12. Results for this Example 2 are provided in Table 2. For a particular set of conditions, mainly the feed rate, the reaction is run for a sufficient amount of the time (>10 turn over volume of the reactor) so that steady-state condition is established for the sampling and the characterization of the product.

TABLE 2

| Feed Rate (ml/min) | Holdup Time (hours) | Conversion, % | MW | Cat. STY g/g cat hr |
|---|---|---|---|---|
| 1.7 | 2.41 | 37.8 | 893 | 2.3 |
| 2.5 | 1.67 | 38.7 | 900 | 3.5 |
| 5.0 | 0.83 | 37.2 | 889 | 6.8 |
| 12.3 | 0.34 | 30.1 | 1105 | 13.5 |

Comparative Example 2

The experiment of Example 2 is repeated, except for the catalyst being the pretreated solid resin Nafion® 115 film material. Results for this Comparative Example 2 are provided in Table 3.

TABLE 3

| Feed Rate (ml/min) | Holdup Time (hours) | Conversion, % | MW | Cat. STY g/g cat hr |
|---|---|---|---|---|
| 1.7 | 2.41 | 38.2 | 850 | 2.4 |
| 2.5 | 1.67 | 38.4 | 859 | 3.5 |
| 5.0 | 0.83 | 30.2 | 1047 | 5.5 |
| 12.3 | 0.34 | 17.5 | 1432 | 7.9 |

Comparison of the results in Tables 2 and 3 shows higher productivity in the process of the invention (Table 2) than the comparative process (Table 3) when high through put is fed to the reactor. This could translate to using less of the more active catalyst for carrying out the THF polymerization or copolymerization which could lead to better mixing and catalyst filtration in commercial applications and cost savings in the use of the present improved process.

Example 3

Continuous EO/THF polymerization is carried out at 55° C. and atmospheric pressure in a 1000 ml glass reactor, with an effective working volume of 500 ml, equipped with a side outlet and a mechanical agitator with a speed of approximately 350 rpm. The reaction mixture contains 27.0 wt ° A EO, 0.41 wt % deionized water, and balanced with THF. The reaction mixture is fed by a pump to the top of the reactor through a dip tube. The product mixture flows out of the reactor through the side outlet which is covered by polyethylene cloth to retain the catalyst. The reactor capacity for the reaction mixture is therefore about 500 ml. Then added are 25 grams (about 5 wt % of the reaction mixture) of the pretreated solid resin Solexis Aquivion® E87-105 film as catalyst. The reactor is continuously agitated during the course of the experiment. Various feed rates are used, in the range of 1 ml/min to 3 ml/min. A small sample (2-3 ml) of the product is taken at intervals and dried in a vacuum oven for 3 hours at 120° C. for conversion measurements. The bulk of the product mixture is collected every few hours and the unreacted feed materials are removed using a rotary evaporator at a temperature of about 99° C. (boiling water bath) and partial vacuum to provide the polymerization products for analyses.

The polymerization product samples are measured for EO and THF conversion or EO/THF polymer productivity and the molecular weight of the product by GPC. The performance of the catalyst at the various feed rates is compared based on the overall conversions or the catalyst's polymer productivity, space time yield (STY) in the units of polymerization product g/g cat hr. The APHA color of the product is determined to average about 12. Results for this Example 3 are provided in Table 4. For a particular set of conditions, mainly the feed rate, the reaction is run for a sufficient amount of the time (>10 turn over volume of the reactor) so that steady-state condition is established for the sampling and the characterization of the products.

TABLE 4

| Feed Rate (ml/min) | Holdup Time (hours) | Conversion, % | MW | Cat. STY g/g cat hr |
|---|---|---|---|---|
| 1.0 | 8.2 | 71 | 3350 | 1.5 |
| 1.5 | 5.5 | 70 | 3300 | 2.2 |
| 2.0 | 4.0 | 67 | 3000 | 2.8 |
| 3.0 | 2.7 | 60 | 2700 | 3.7 |

Comparative Example 3

The experiment of Example 3 is repeated, except for the catalyst added being 45 grams (about 9 wt % of the reaction mixture) of the pretreated solid resin Nafion® 115 film material. Results for this Comparative Example 3 are provided in Table 5.

TABLE 5

| Feed Rate (ml/min) | Holdup Time (hours) | Conversion, % | MW | Cat. STY g/g cat hr |
|---|---|---|---|---|
| 1.0 | 8.2 | 71 | 3350 | 0.8 |
| 1.5 | 5.5 | 70 | 3300 | 1.2 |
| 2.0 | 4.0 | 67 | 3000 | 1.6 |
| 3.0 | 2.7 | 60 | 2700 | 2.0 |

Comparison of the results in Tables 4 and 5 shows higher productivity in the process of the invention (Table 4) than the comparative process (Table 5).

While the illustrative embodiments of the invention have been described with particularity, it will be understood that various other modifications will be apparent to and may be readily made by those skilled in the art without departing from the spirit and scope of the invention.

Accordingly, it is not intended that the scope of the claims hereof be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A process for manufacturing polyether glycol or copolyether glycol having a mean molecular weight of from about 200 dalton to about 30,000 dalton which comprises the step of polymerizing a reaction mixture comprising at least one tetrahydrofuran or at least one tetrahydrofuran and at least one other cyclic ether at polymerization effective conditions in the presence of a catalytically effective amount of perfluorosulfonic acid resin catalyst comprising a copolymer of tetrafluoroethylene or chlorotrifluoroethylene and a monomer of the formula $CF_2=CF-O-CF_2-CF_2-SO_2F$, said catalyst having an equivalent weight of from 700 to 1100 grams/gram-mol of sulfonic acid, and optionally in the presence of an acylium ion precursor, carboxylic acid, and/or a chain terminator.

2. The process of claim 1 wherein the tetrahydrofuran is selected from the group consisting of tetrahydrofuran, 2-methyltetrahydrofuran, 3-methyltetrahydrofuran, 3-ethyltetrahydrofuran and combinations thereof.

3. The process of claim 1 wherein the other cyclic ether is alkylene oxide selected from the group consisting of ethylene oxide; 1,2-propylene oxide; 1,3-propylene oxide; 1,2-butylene oxide; 2,3-butylene oxide; 1,3-butylene oxide; 2,2-bis-chloromethyl oxetane; epichlorohydrin and combinations thereof.

4. The process of claim 1 wherein the acylium ion precursor is selected from the group consisting of acetyl halides, carboxylic acid anhydrides and combinations thereof.

5. The process of claim 1 wherein the carboxylic acid is an aliphatic carboxylic acid of form 1 to 16 carbon atoms or combinations thereof.

6. The process of claim 1 wherein the chain terminator is selected from the group consisting of water, alkanediol containing from 2 to about 10 carbon atoms and combinations thereof.

7. The process of claim 1 wherein the polymerization effective conditions include a temperature of from about 0° C. to about 80° C., and a pressure from about 200 to about 800 mmHg.

8. The process of claim 7 in continuous mode with a residence time from about 10 minutes to about 10 hours.

9. The process of claim 7 in batch mode with a residence time from about 1 to about 24 hours.

10. The process of claim 1 wherein the catalytically effective amount of perfluorosulfonic acid resin catalyst is from about 0.01% to about 30% by weight of the reaction mixture.

* * * * *